United States Patent
Morales-Balado et al.

(10) Patent No.: US 7,608,669 B2
(45) Date of Patent: Oct. 27, 2009

(54) PREPARATION OF IMPACT-RESISTANT THERMOPLASTIC MATERIALS ON THE BASIS OF STYRENE/BUTADIENE COPOLYMERS WITH POLYDISPERSE BLOCKS

(75) Inventors: Graciela Morales-Balado, Saltillo (MX); Rodolfo Flores-Flores, Tampico (MX); Antonio Montalvo-Robles, Cuidad Madero (MX); Ramon Enrique Diaz De Leon-Gomez, Saltillo (MX); Pablo Acuna-Vazquez, Saltillo (MX)

(73) Assignee: Dynasol Elastomeros, S.A. De C.V., Altamire (Tamaulipas) (MX)

( * ) Notice: Subject to any disclaimer, the term of this patent is extended or adjusted under 35 U.S.C. 154(b) by 136 days.

(21) Appl. No.: 10/537,738

(22) PCT Filed: Nov. 8, 2002

(86) PCT No.: PCT/MX02/00105

§ 371 (c)(1),
(2), (4) Date: Mar. 23, 2006

(87) PCT Pub. No.: WO2004/041887

PCT Pub. Date: May 21, 2004

(65) Prior Publication Data

US 2006/0194915 A1    Aug. 31, 2006

(51) Int. Cl.
*C08F 297/04*   (2006.01)
*C08L 53/02*    (2006.01)
*C08F 2/38*     (2006.01)

(52) U.S. Cl. .................. 525/314; 525/316; 525/940

(58) Field of Classification Search ............... 525/314, 525/316, 940
See application file for complete search history.

(56) References Cited

U.S. PATENT DOCUMENTS

| 4,153,647 | A | | 5/1979 | Glukhovskol | |
| 4,584,346 | A | * | 4/1986 | Kitchen ....................... | 525/98 |
| 5,229,472 | A | * | 7/1993 | Binsbergen et al. .......... | 526/64 |
| 5,428,106 | A | | 6/1995 | Schrader | |
| 5,705,569 | A | * | 1/1998 | Moczygemba et al. ...... | 525/314 |
| 6,235,847 | B1 | * | 5/2001 | Hoshi et al. ................. | 525/314 |

FOREIGN PATENT DOCUMENTS

EP    0 879 836 A    11/1998

* cited by examiner

*Primary Examiner*—Fred M Teskin
(74) *Attorney, Agent, or Firm*—Browdy and Neimark, PLLC

(57) ABSTRACT

This invention describes the obtainment of impact-resistant materials from a block copolymer that comprises as monomers an alkadiene (conjugated diene) and a vinyl aromatic compound, which is used as impact modifier to obtain such materials and in which, at least, one of the blocks of the vinyl aromatic compound is polydisperse. The invention allows obtaining morphologies such as rods, points or capsules by incorporating such copolymer into a polymeric matrix derived from vinyl aromatic monomers independently from other agents such as chain transfer agents, and achieving increases, in the impact values up to 50% through the use of the copolymer of this invention.

18 Claims, 5 Drawing Sheets

PREPARATION OF IMPACT-RESISTANT THERMOPLASTIC MATERIALS ON THE BASIS OF STYRENE/BUTADIENE COPOLYMERS WITH POLYDISPERSE BLOCKS

BACKGROUND OF THE INVENTION

In general, reinforcement of fragile thermoplastic polymers by the incorporation of a rubber, brings about in them considerable increase of their firmness, and thus making them impact-resistant material. In this sense, it is well-known that the polystyrene (PS), and the poly(styrene-co-acrylonitrile (PSAN) are thermoplastic polymers with a low firmness. However, when they are reinforced with an elastomer it is obtained the high-impact polystyrene (HIPS) and poly(acrylonitrile-bultadiene-styrene) (ABS), impact-resistant thermoplastic materials, which are formed by a rigid PS and PSAN matrix, respectively, with rubber particles dispersed in such matrixes. Likewise, final properties of these materials depend, among several other parameters, upon the size and type of morphology of present particles. Therefore, a deviation from the HIPS and BS properties and features may be achieved to the extent in which rubber particles are able to present different morphologies.

In this way, there are several and well-known strategies in the state of the art in order to produce changes in size and type of particles in a HIPS and ABS. The most important factor is the type of rubber used. Thus, styrene/butadiene copolymers represent an excellent alternative to obtain HIPS and ABS since through such copolymers and through variation in composition of polystyrene in the copolymer, particles with different morphologies may be obtained (Angew. Makromol, Chem. 90 (1980) 95, and Angew. Makromol. Chem 175 (1977) 58). In addition, by using this type of elastomers, it is possible to combine in HIPSs and ABSs, good mechanical and optical properties. Due to the above, several research have been carried out prior to this one, focusing their efforts in obtaining HIPS and ABS, and using to that end an extensive variety of styrene/butadiene copolymers in order to obtain materials with a suitable balance in their mechanical and optical properties and mainly due to the different morphologies of particles present in HIPS and ABS.

For example, U.S. Pat. No. 4,838,418 details the obtainment of HIPS mainly with capsular morphology through polymerization of styrene in presence of a styrene/butadiene copolymer with a 40/60 ratio and a chain transference agent as regulator of the of the polystyrene matrix molecular weight. On the other hand, U.S. Pat. No. 4,771,107 outlines the use of styrene/butadiene copolymers with a high-styrene content to produce ABS with good transparency. On its part, U.S. Pat. No. 5,223,577 by means of using styrene/butadiene copolymers, and from polymerization of styrene and acrylonitrile in presence of such copolymers, details how to obtain ABS with good optical and mechanical properties.

More recently, U.S. Pat. No. 5,756,579 details the use of styrene/butadiene copolymers with a low-styrene content to produce ABS with excellent balance between the physical and mechanical properties. U.S. Pat. No. 4,990,236 reports the synthesis of impact-resistant material through the in situ formation of an implanted copolymer by using, to that end, different SBR-, SBS-, BSB- and/or SBSB-type styrene/butadiene copolymers with different compositions, and styrene by means of a polymerization process in solution.

On the other hand, U.S. Pat. Nos. 5,428,104, and 5,591,195 outline the HIPS synthesis by using block copolymers of styrene/butadiene with a 30/70 ratio, where the particles obtained present capsule and hank-type morphologies, while the materials have a good firmness together with a high brightness. The reason for which different morphologies are obtained by using the same copolymer is due to the use of different concentrations of a chain transference agent during the synthesis process.

On the other hand, U.S. Pat. No. 5,473,014 details the production of HIPS with different morphologies by using mixtures of styrene/butadiene copolymers with different compositions, or else, by means of the joint action of polybutadiene and styrene/butadiene copolymers in different proportions. Therefore, capsule-, cell- and roll-type morphologies are featured and materials obtained display high brightness and great impact resistance, at the same time.

U.S. Pat. Nos. 5,985,997 and 4,524,180 outline the styrene polymerization reaction in presence of polybutadiene and a styrene/butadiene block copolymer with a 40/60 ratio. The obtained HIPS feature a bimodal distribution of particles with capsule-type morphologies, with a particle size of 0.2 to 0.6 µm, and particles with salami-type morphologies with a size of 1.2 to 8 µm. The presence of such particle types and sizes give the material, at the same time, good mechanical and optical properties.

From what has been outlined above, it can be mentioned that although all the afore-cited patents detail how to obtain the HIPS featuring different morphologies, size, and distribution of particles, they are obtained by using chain transference agents, which regulate the implanting reaction of styrene on the rubber; or else, by jointly using polybutadiene and/or styrene/butadiene copolymers in different compositions.

OBJECTS OF THE INVENTION

Therefore, this invention is aimed at causing changes in the morphology of elastomeric particles of different impact-resistant thermoplastic material leading to an improvement mainly in resistance to impact, by using to that end styrene/butadiene copolymers.

Another purpose of this invention is to attain morphological changes by means of a variation in the polydispersity of polystyrene block in styrene/butadiene copolymers.

BRIEF DESCRIPTION OF FIGURES

Next are outlined the micrographies obtained for the different examples, and which will allow to understand with more detail, the outline of this invention.

DETAILED DESCRIPTION OF THE INVENTION

Figure 2:
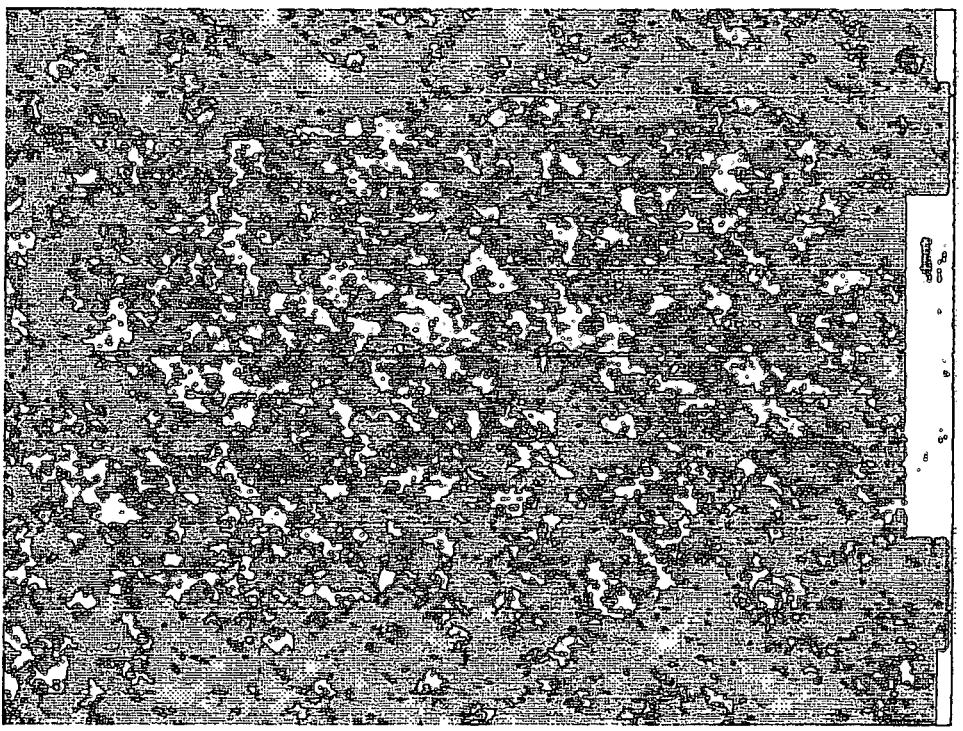
FIG. 2 is an image obtained through transmission electronic micrography with a 10,000 magnification corresponding to example 4 of this description where the bar placed at the bottom of the micrography corresponds to 500 nm.

This invention allows the preparation of impact-resistant thermoplastic material, which can be obtained from:

A) A block copolymer based on alkadiene (conjugated diene), and an aromatic vinyl compound with at least one block of the polydispersed vinyl aromatic compound; and B) A monomer from a vinyl aromatic compound and may be used to shape mould parts, film manufacturing, foams, thermo-moldings, injection molding or extruded profiles, polymeric mixtures and soles for shoes, among others.

This description refers in particular to obtaining high-impact polystyrene from copolymers in styrene/butadiene blocks featuring rubber particles with diverse morphologies: capsule, rods and dots, among others and which mainly depends on the polydispersity of the polystyrene block in predecessor copolymer. However, it will be conspicuous for an expert in the matter there are many other block polymers and those to which this invention precepts may apply, for which reason this invention shall not be deemed as limited by the specific embodiments outlined, but rather, by the attached claims.

The production of impact-resistant materials, according to this invention, is performed through polymerization, preferably selected among batch polymerization, continuous or semi-continuous polymerization, polymerization of a vinyl aromatic monomer solution, preferably styrene, and a block copolymer based on an alkadiene (conjugated diene), and a vinyl aromatic compound, with at least, a block of the polydispersed vinyl aromatic compound, preferably a styrene/butadiene copolymer with a polydispersity of the polystyrene block at interval of 1.01 to 4. The production of such materials is preferably carried out by a mass process, thoroughly outlined in the state of the art, by using free radical initiators, variable agitation between 30-150 rpm, and by using a configuration in the agitation system preferably of the anchor-turbine type, until attaining the inversion of phases. Once it has happened, generally at 20-40% of conversion, reaction is resumed in suspension by using a suspension medium, which basically consists of water, polyvinyl alcohol, nonylphenol- and sodium chloride in variable ratios. Any other well-known suspension medium, however, can be used in the state of the art as regards polymerization processes in suspension. Materials produced in that way present diverse morphologies dot-, rod- or capsule-type., which will mainly depend on the block polydispersity of polystyrene in the predecessor copolymer, with particle sizes of 0.2 µm, which at the same time, give the material a good transparency and impact.

Copolymers that may be used in this invention are preferably selected from the group consisting of linear, radial, perfect and partially randomized block copolymers corresponding to funeral formula (I)

$$[(B-(B/S)_i-S)_j]_k-Z \qquad (I)$$

wherein i, j and k are an integer equal to or greater than 1;

Z is a residue of a coupling agent or a termination agent;

S is a vinyl aromatic monomer; and

B is a conjugated diene;

and where the elastomeric portion (alkadiene) may be totally or partially hydrogenated. The S/B copolymer composition is from 10/90 to 90/10, preferably 20/80 to 80/20, and more preferably 30/70 to 40/60. Molecular weights of copolymer can be between the interval 100,000 to 450,000 g/mol. The molecular weight of the vinyl aromatic monomer-based polymer block ranges between the interval of 5,000 to 420,000 g/mol, preferably 30,000 to 120,000 g/mol, and the vinyl aromatic monomer block presents a polydispersity Mw/M at the interval of 1.01 to 4. Copolymers with the afore-outlined molecular parameters are preferably obtained through anionic polymerization; but any other polymerization method may be indistinctly used and which leads to the formation of copolymers with the desired characteristics.

For the production of impact-resistant materials from block copolymers with polydispersed blocks, subject matter of this invention, the styrene monomer is preferably used. However, it is possible to use different vinyl aromatic monomers, understanding as such, the non-saturated ethylene compound of the formula (11):

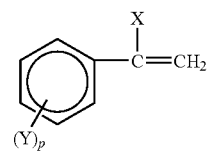

Where X represents a hydrogen or a $C_1$-$C_4$ alkyl radical;

p is zero or an integer from 1 to 54; and

Y represents a halogen or a $C_1$-$C_4$ alkyl radical.

Among the vinyl aromatic monomers responding to the formula (I) according to this invention are the following: toluene vinyl, styrene, methyl-styrene, mono-, di-, tri-, tetra-, and penta-chlorostyrene, and the corresponding alpha-methylstyrene, alkylated in the nucleus, and the corresponding to alpha-methylstyrene; ortho- and para-methylstyrene, ortho- and para-ethylstyrene, ortho- and para-methyl-alpha-styrene, among others. These monomers can be used alone or in combinations of them, or with any other polymerizable monomer, preferably acrylic monomers, methacrylic, acrylonitrile, and maleic anhydride, among others.

Among the alkadiene or conjugated diene that may be used for the synthesis of copolymers used in this invention, are those having in their molecules from 4 to 8 carbon atoms such as 1,3-butadiene, isoprene, 2,3-dimethyl-1,3-butadiene, piperylene, and mixtures of them. The 1,3-butadiene is the specific one that has been preferred.

The implant polymerization reaction of the vinyl aromatic monomer on the block copolymers subject matter of this invention, can be carried out through a mass process, solution, suspension and/or emulsion, as well as any other modification and/or combination of them such as mass-mass processes, and mass-suspension or a mechanical process.

It is also possible to add mineral oil and a chain transference agent (molecular weight regulator) to the polymerization process (thermally initiated or through the use of compounds able to generate azo-type or peroxidic free radicals), jointly or separately used in order to control, at the same time, the ratio of implanted polystyrene in the copolymer and the molecular weight of the polystyrene matrix. With this, the properties of the impact polystyrene flow can be regulated, depending on the application and type of process it is subjected to.

Likewise, in order to avoid degradation caused by high temperatures and high mechanical efforts during the final process of the material, antioxidants such ad 2,6di-tert-butyl-4-metyl-phenol and trisnonylphenyl phosphite may be used, in addition to brightness stabilizers such as 2-alkyl-2,3,4-benzotriazol, whether in the polymerization process, or else, upon material processing.

Once we have generally outlined this invention, one can understand it better by referring to the specific examples stated below aimed at depicting this invention, but in any case, as a limitation thereof.

EXAMPLES

Synthesis of Predecessor Copolymers

Raw materials used to prepare high impact materials, in particular HIPS, are generally styrene/butadiene linear copolymers with a variable weight ratio of 10/90, 20/80, 30/70, 40/60, and 80/20, and partially randomized.

To obtain styrene/butadiene copolymers with polydispersed polystyrene block, it was carried out the batch anionic polymerization by using controlled additions of the initiator or the termination agent or coupling agent or a combination of them. At the end of the polymerization reaction, octadecyl 3-(-3.5di-ter-buthy-4-hydroxyl)propionate, and 2,5,di-ter-butyl-p-cresol where added as antioxidants aimed at protecting the product during the processes for solvent elimination (evaporation or coagulation), drying and storage. In all cases, molecular weights of polymers were determined through gel permeation chromatography by using polystyrene standards. For the case of determining molecular weights of polystyrene blocks and block polydispersity, copolymers were previously treated through technique stated in standard ASTM D3314 (year 1992).

Some examples of styrene/butadiene copolymers with variable compositions and blocks of polydispersed polystyrene are depicted in Table 1.

TABLE 1

Main characteristics of styrene/butadiene copolymers with block of polydispersed polystyrene.

| Co-polymer | Rubber Mp (Kg/mol) | Total PS | Block PS | Mp Block PS (Kg/mol) | I = (Mw/Mn) Block PS | Vinyl |
|---|---|---|---|---|---|---|
| H1-PT1 | 329 | 39.2 | 30.3 | 67 | 1.10 | 8.5 |
| H2-E33 | 318 | 40.1 | 30.9 | 74 | 1.27 | 8.5 |
| H3-EP3 | 318 | 39.3 | 31.0 | 63 | 1.43 | 8.5 |
| H4-TAR | 310 | 40.5 | 30.5 | 61 | 1.64 | 8.5 |
| H5-L09 | 232 | 32.6 | 25.4 | 36 | 1.05 | 9.9 |
| H6-M02 | 240 | 29.6 | 22.8 | 22 | 1.35 | 9.5 |
| H7-M03 | 190 | 29.5 | 21.6 | 30 | 1.52 | 9.7 |
| H8-M04 | 269 | 27.0 | 18.0 | 31 | 1.55 | 8.2 |

The synthesis technique already outlined to get styrene/butadiene copolymers with polydispersed polystyrene blocks depicted in Table 1, is stated having as purpose to explain the possibility to obtain copolymers with partially randomized and polydispersed blocks, but in any event represents a restriction of the type of structure to obtain, since by means of this inventions several macromolecular structures may be obtained.

HIPS Synthesis

Aimed at demonstrating the efficiency of copolymers in this invention as to the production of HIPS, they were produced by using the mass-suspension technique. This synthesis technique was applied in same manner as all other reactions.

Example 1

In a reactor with a 1 gallon capacity, 920 g (92% P/P) of styrene were added, as well as 80 g (8% P/P) of copolymer H1-PT1 (Table 1), and was stirred up at 65 rpm at room temperature until the complete dissolution of elastomer. By this time, it was added a 0.05% P/P of benzoyl peroxide (BPO) and polymerized at 80° C. and keep the stirring up constant at 40 rpm until inversion of phases (25-30% of conversion). Thereafter, 0.1% P/P of terbutyl perbenzoate (PBTB) was incorporated to the reaction system, followed by the suspension medium. The latter consisted of 2 liters of water, 1.8 g of polyvinyl alcohol, 0.7 g of nonylphenol, and 1,7 g of sodium chloride. The polymerization reaction continued at an agitation speed of 650-700 rpm following a ramp program temperature-time of 2 hours, at 125° C., 2 hours at 145° C. Thereafter, the product (pearls) was filtrated, cleansed and dried.

From a fraction of the obtained pearls, it was determined the content of gel by using to that end, low-temperature centrifugation. Having freed the polystyrene, the molecular weight of polymeric matrix was determined through gel permeation chromatography (GPC), by using polystyrene standards.

The rest of the material (pearls), was subjected to a jet molding technique, from which pipettes were obtained with the sizes set out for impact-resistance mechanical test according to standard AST D-256 (Year 2000). In addition of mechanical tests, the fluidity rate was measured according to standard ASTM 1238 (year 2001). The corresponding values for such determinations are depicted in Table 2. Morphology of particles was observed through transmission electronic microscopy (TEM), and were previously cut in cryogenic ultramicrotome and thereafter tinted with osmium tetroxide, according to the technique thoroughly reported by Kato (Kato, K. *Polym. Eng. Sci.* 7, 38, 1967).

Figure 1:
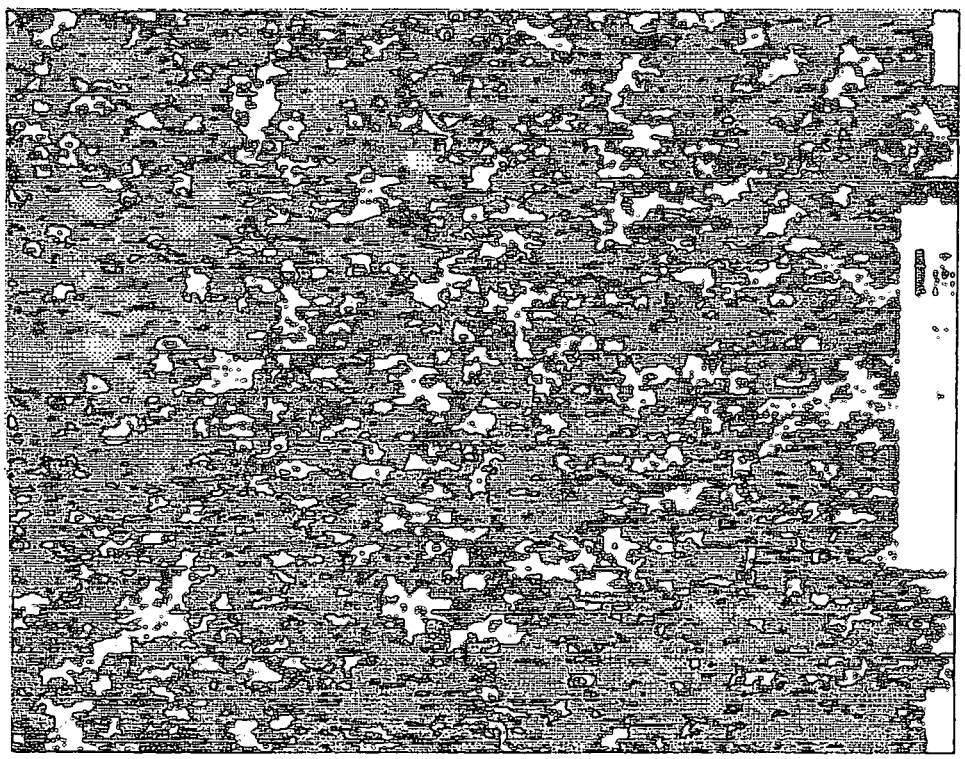
FIG. 1 is an image obtained through transmission electronic microscopy with a 10,000 magnification corresponding to example 1 of this description where the bar placed at the bottom of such micrography corresponds to 500 nm

For this particular example, the morphology of elastomeric particles is capsule-type and the size of particle is 125 nm (see FIG. 1). Likewise, by using the transference agent, the type of morphology is kept, but not the size of particles, which now present a size of 234 nm (see example 9).

In the other examples explained, morphology of particles is core-shell type or capsule-type, although in some cases, by changing the initiator concentration, obtained morphologies were dot and rod-type. By changing compositions of copolymers, mainly salami-type morphologies could also be obtained with PB/PS compositions of 80/20 and 90/10.

For all the examples below, impact-resistant values, fluidity ratio, matrix molecular weight, gel content, and particle size, all of them are depicted in Table 2.

Example 2

Same as example 1, but by using H2-E33 copolymer, with a 1.27 polystyrene block polydispersity.

Example 3

Same as example 1 but with HE-E93 1.43 polystyrene block polydispersity.

Example 4

Same as example 1 but using H4-TAR copolymer, with a polystyrene block polydispersity of 1.64 (see FIG. 2). Particle size, of core-shell type, in this case, is 155 nm.

Example 5

Figure 3:
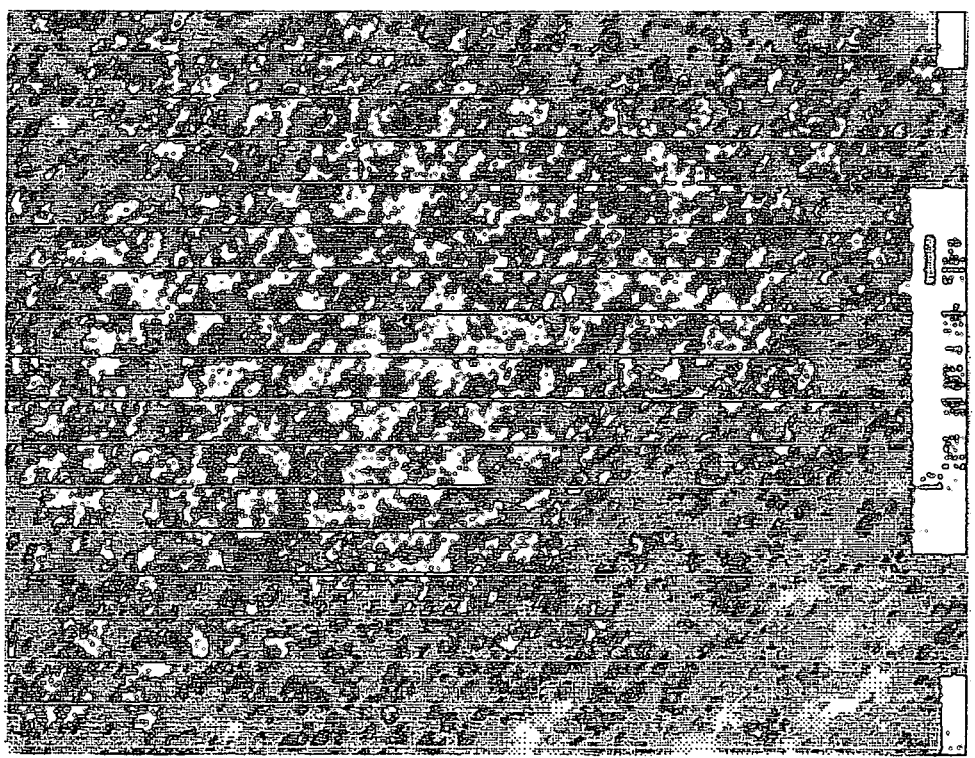
FIG. 3 is an image obtained through transmission electronic micrography with a 10,000 magnification corresponding to example 5 of this description where the bar placed at the bottom of the micrography corresponds to 500 nm.

Same as example 1 but adding 0.1% P/P BPO at the beginning of the reaction and using H5-L09 copolymer, with polystyrene block polydispersity of 1.05 (see FIG. 3). Particle size, around 149 nm.

Example 6

Same as example 5 but using H6-M02 copolymer, with polystyrene block polydispersity of 1.35.

Example 7

Same as example 5 but using H7-M03 copolymer, with polystyrene block polydispersity of 1.52.

Example 8

Figure 4:
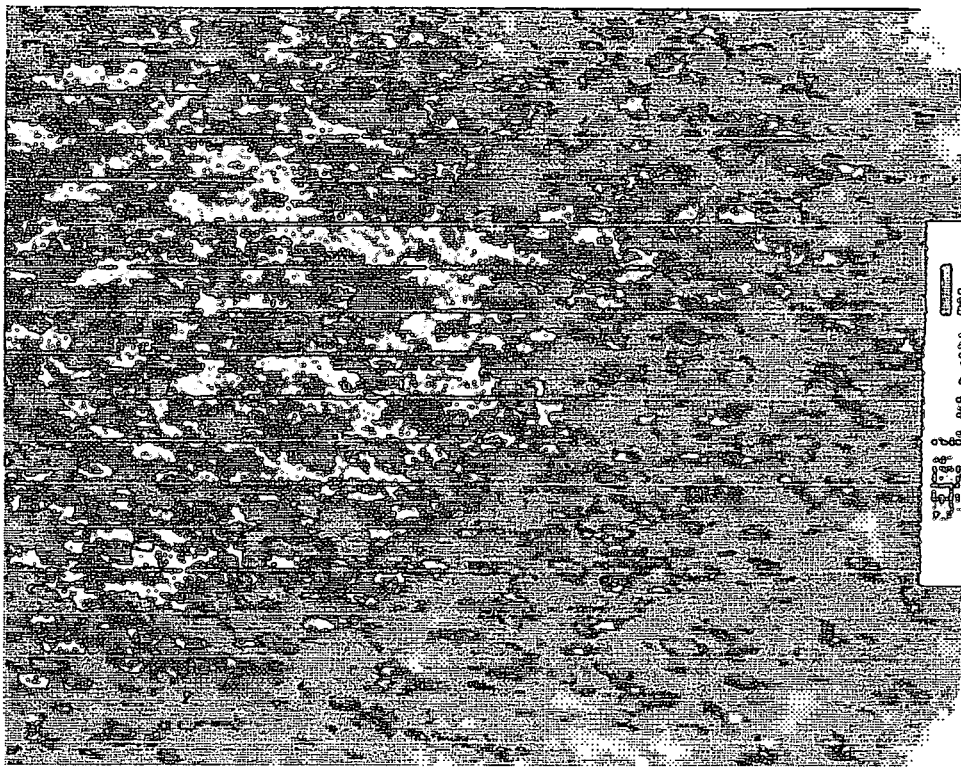
FIG. 4 is an image obtained through transmission electronic micrography with a 10,000 magnification corresponding to example 7 of this description where the bar placed at the bottom of the micrography corresponds to 500 nm.

Same as example 5 but using H8-M04 copolymer, with polystyrene block polydispersity of 1.55 (see FIG. 4). In this particular example, particles present core-shell or capsule type morphologies, with particle size of 181 nm.

Example 9

Figure 5:
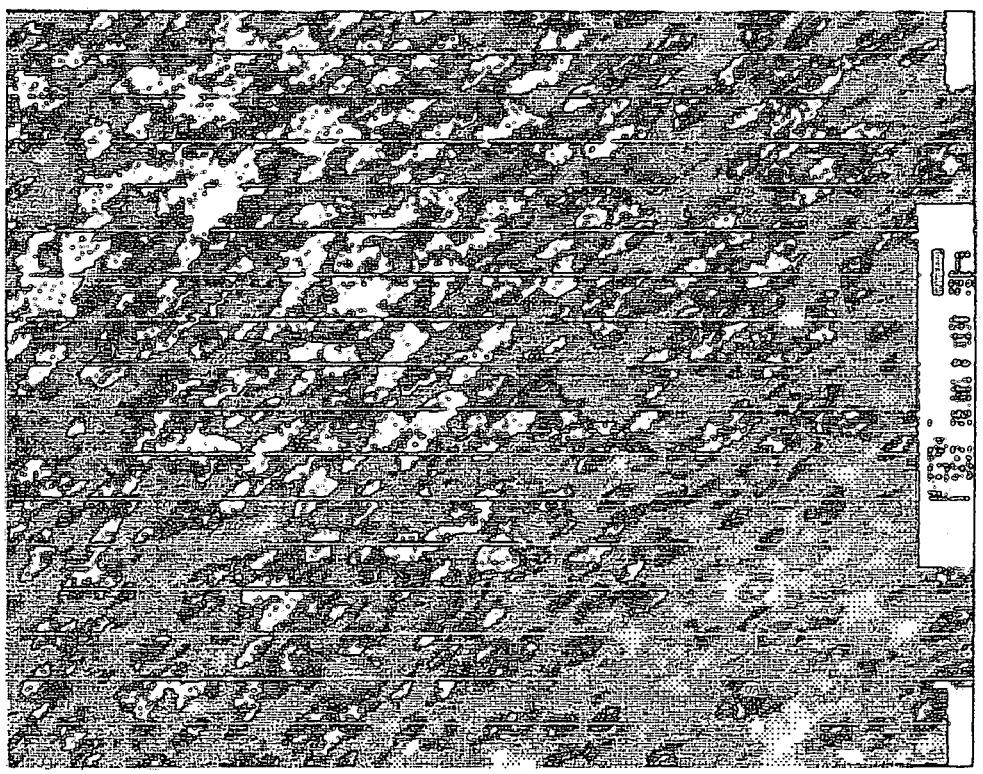
FIG. 5 is an image obtained through transmission electronic micrography with a 10,000 magnification corresponding to example 9 of this description where the bar placed at the bottom of the micrography corresponds to 500 nm.

Same as example 1 but adding at the beginning of the reaction 0.025 % P/P t-dodecyl mercaptan as chain transfer agent (see FIG. 5).

Example 10

Figure 6:
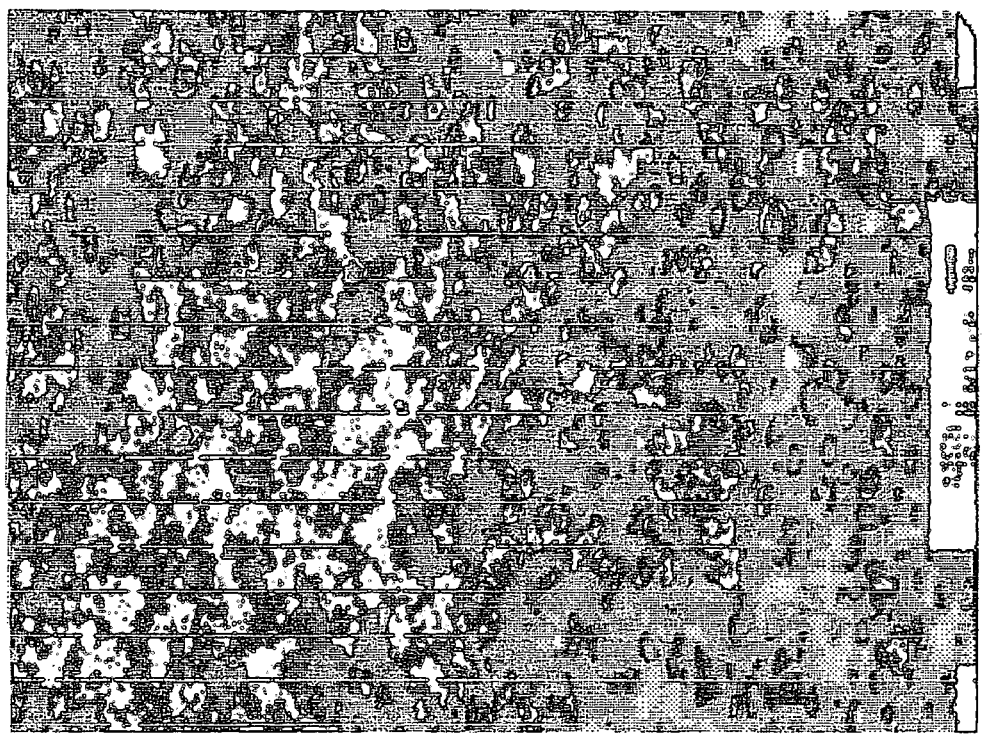
FIG. 6 is an image obtained through transmission electronic micrography with a 10,000 magnification corresponding to example 10 of this description where the bar placed at the bottom of the micrography corresponds to 500 nm.

Same as example 4 but adding at the beginning of the reaction 0.025 % P/P t-dodecyl mercaptan as chain transfer agent (see FIG. 6). Particle size increases by adding chain transfer agent, being now of 225 nm in contrast with 155 nm of HIPS obtained under the same conditions but with no transfer agent.

Example 11

Figure 7:
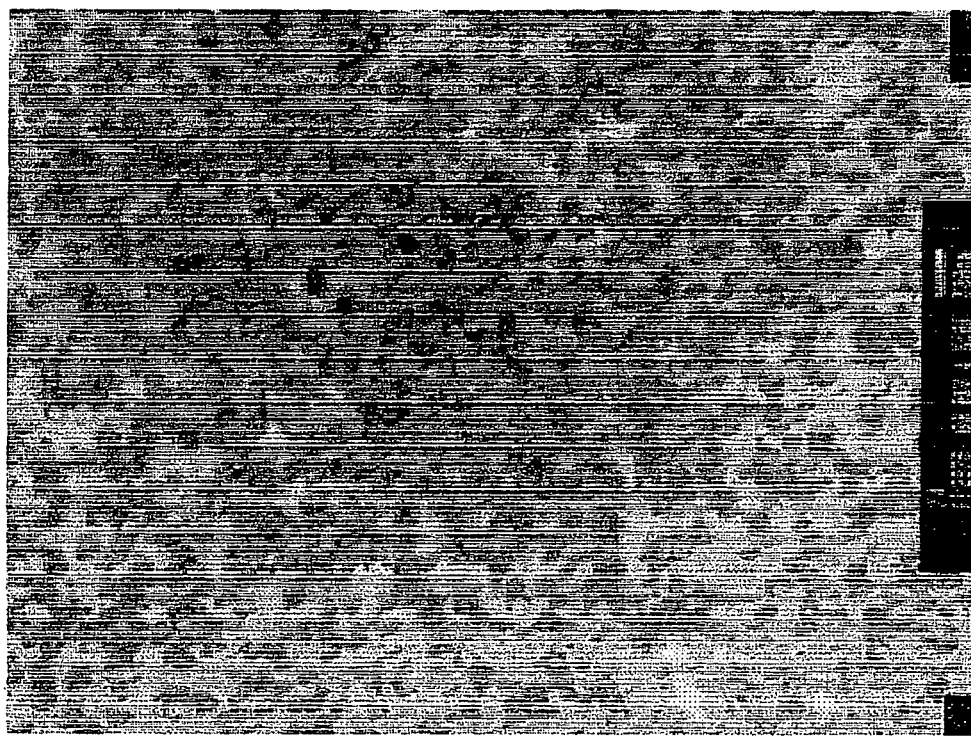
FIG. 7 is an image obtained through transmission electronic micrography with a 10,000 magnification corresponding to example 11 of this description where the bar placed at the bottom of the micrography corresponds to 500 nm.

Same as example 5 but adding at the beginning of the reaction 0.05 % P/P t-dodecyl mercaptan as chain transfer agent (see FIG. 7), with presence of core-shell particles of 174 nm.

Example 12

Figure 8:
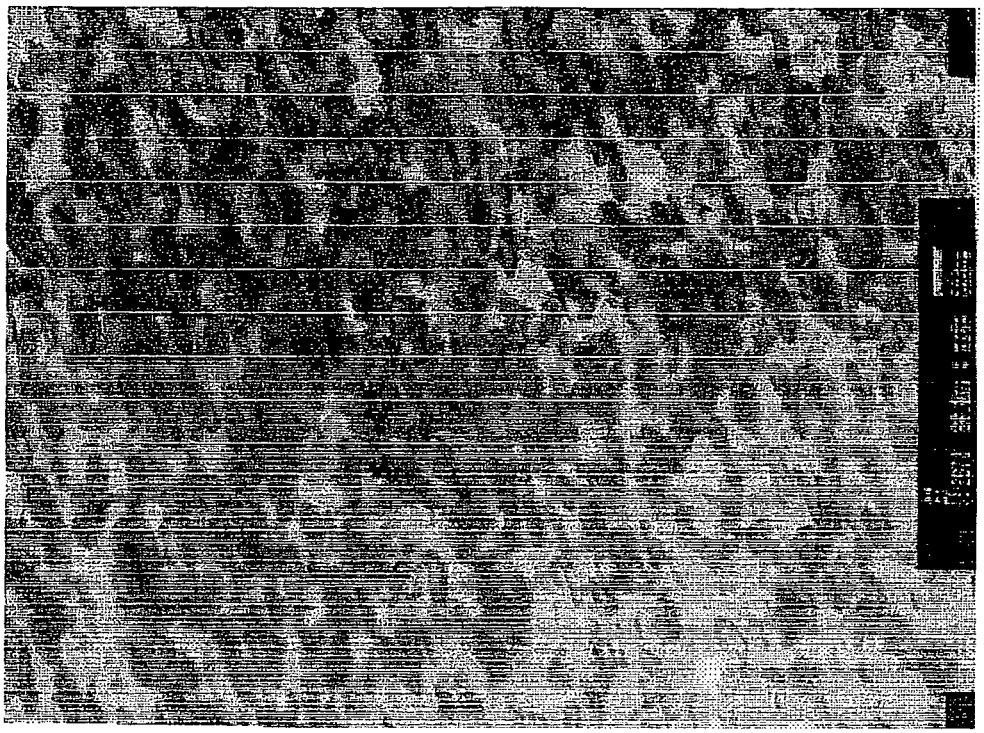
FIG. 8 is an image obtained through transmission electronic micrography with a 10,000 magnification corresponding to example 12 of this description where the bar placed at the bottom of the micrography corresponds to 500 nm.

Same as example 6 but adding at the beginning of the reaction 0.05 % P/P t-dodecyl mercaptan as chain transfer agent (see FIG. 8). For this specific case, a large size particle was obtained, 192.6 nm, which has an effect on the higher impact resistance value of 41.10 J/m.

TABLE 2

Results of different properties of produced HIPS.

| Example | I = (Mw/Mn) PS block of precursor copolymer | Resistance to Izod impact (J/m) | Melt index (g/10 min) | Mn of PS matrix (Kg/mol) | Gel contents (%) | Particle size (nm) |
|---|---|---|---|---|---|---|
| 1  | 1.10 | 16.54 | 0.46  | 90.4  | 25.15 | 125.35 |
| 2  | 1.27 | 19.21 | 0.70  | 98.9  | 23.23 | 137.74 |
| 3  | 1.43 | 20.30 | 0.94  | 122.0 | 26.21 | 145.17 |
| 4  | 1.64 | 25.62 | 0.76  | 117.3 | 27.54 | 154.65 |
| 5  | 1.05 | 27.22 | 0.50  | 81.4  | 22.59 | 149.19 |
| 6  | 1.35 | 28.29 | 3.76  | 96.2  | 17.81 | 153.37 |
| 7  | 1.52 | 29.35 | 3.34  | 110.0 | 18.66 | 156.58 |
| 8  | 1.55 | 36.30 | 3.00  | 94.1  | 19.71 | 181.34 |
| 9  | 1.10 | 25.08 | 6.47  | 79.4  | 20.19 | 234.28 |
| 10 | 1.64 | 32.02 | 3.05  | 105.2 | 21.58 | 224.91 |
| 11 | 1.05 | 28.82 | 9.66  | 62.3  | 20.11 | 174.42 |
| 12 | 1.55 | 41.10 | 10.07 | 79.1  | 19.07 | 292.59 |

Figure 9:
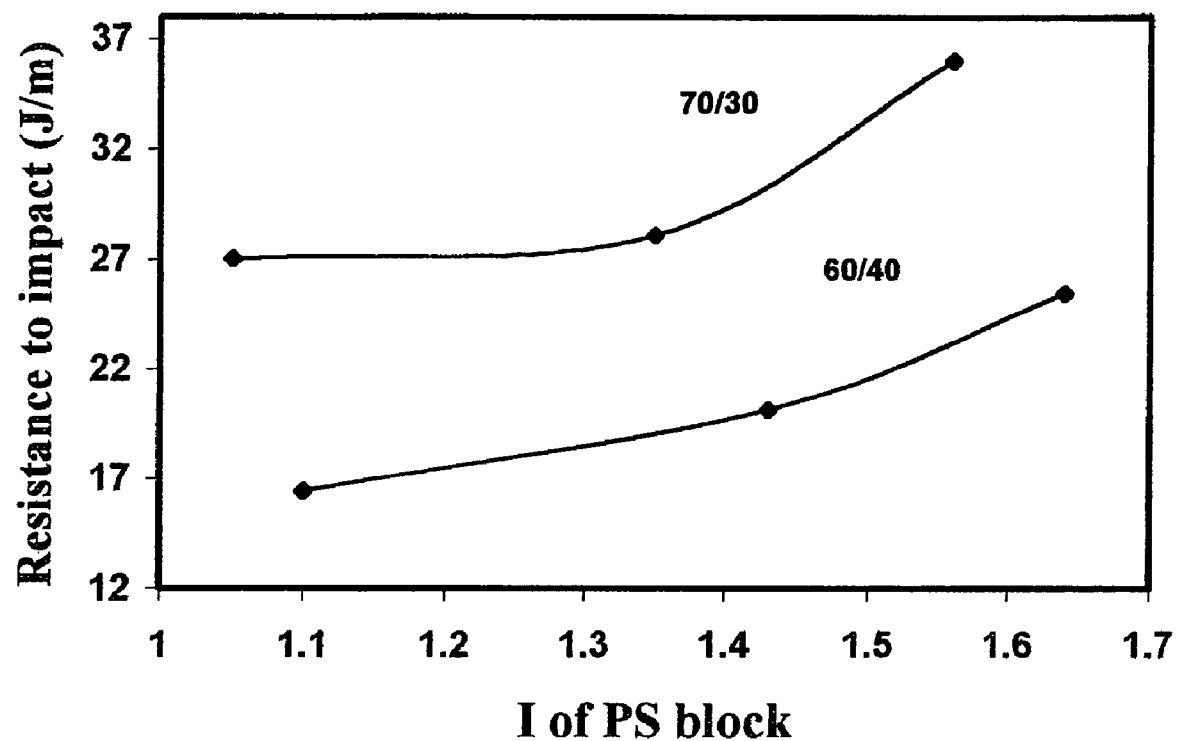
FIG. 9 is a graph where it can be observed the effect in the control of polydispersity in the copolymer styrene block of this invention at the time of being implanted within a polystyrene matrix according to the examples.

FIG. 9 shows the variation of HIPS resistance to impact based on the polystyrene block polydispersity of the precursor copolymer with 60/40 (Examples 1, 3 and 4) and 70/30 (Examples 5, 6 and 8) composition of butadiene/styrene.

The invention claimed is:

1. A composition for producing impact-resistant thermoplastic materials consisting of a block copolymer that comprises as monomers an alkadiene and a vinyl aromatic monomer,
   wherein the block copolymer being selected from the group consisting of linear, radial, perfect and partially randomized blocks having the formula (I):

wherein i, j and k are an integer equal to or greater than 1;
   Z is a residue of a coupling or a termination agent;
   S is the vinyl aromatic monomer; and
   B is the alkadiene, which may optionally be totally or partially hydrogenated;
   wherein the block copolymer has a B/S ratio from 70/30 to 60/40; and at least one block of the vinyl aromatic monomer in the block copolymer is polydispersed having a polydispersity from 1.01 to 4.

2. The composition for producing impact-resistant thermoplastic materials according to claim 1, wherein the molecular weight of the block copolymer is from 100,000 g/mol to 450,000 g/mol.

3. The composition for producing impact-resistant thermoplastic materials according to claim 1, wherein the vinyl aromatic monomer is an ethylenic unsaturated compound of formula (II)

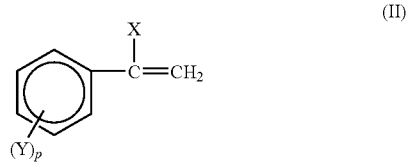

wherein X is a hydrogen or a $C_1$-$C_4$ alkyl radical;
p is zero or an integer from 1 to 5; and
Y is a halogen or a $C_1$-$C_4$ alkyl radical.

4. The composition for producing impact-resistant thermoplastic materials according to claim 3, wherein the vinyl aromatic monomer is selected from the group consisting of vinyl toluene, styrene, methylstyrene, mono-, di-, tri-, tetra- and pentachlorostyrene and the corresponding alpha-methylstyrene, alkylated styrenes in the core and the corresponding alpha-methylstyrenes; ortho- and para-methyistyrenes, ortho- and para-ethyistyrenes, ortho- and para-methyl-alphastyrenes, and mixtures or combinations thereof; or with other copolymerizable monomers.

5. The composition for producing impact-resistant thermoplastic materials according to claim 4, wherein the monomers copolymerizable with the vinyl aromatic monomer are selected from the group consisting of acrylic monomers, methacrylic monomers, acrylonitrile and maleic anhydride.

6. The composition for producing impact-resistant thermoplastic materials according to claim 1, wherein the alkadiene has 4 to 8 carbon atoms.

7. The composition for producing impact-resistant thermoplastic materials according to claim 6, wherein the alkadiene is selected from the group consisting of 1,3-butadiene, isoprene, 2,3-dimethyl-1,3-butadiene, piperylene, and mixtures thereof.

8. The composition for producing impact-resistant thermoplastic materials according to claim 7, wherein the alkadiene is 1,3-butadiene.

9. An impact-resistant thermoplastic composition, comprising a vinyl aromatic monomer and an impact-modifier material consisting of a block copolymer that comprises as monomers an alkadiene and a vinyl aromatic compound, wherein said composition comprises:

A) from 3% to 50% in weight of a block copolymer formed by an alkadiene and a vinyl aromatic monomer, the block copolymer being selected from the group consisting of linear, radial, perfect and partially randomized block copolymers having the formula (I):

wherein i, j, and k are an integer equal to or greater than 1;
Z is a residue of a coupling or a termination agent;
S is the vinyl aromatic monomer; and
B is the alkadiene, which may optionally be totally or partially hydrogenated;
wherein the block copolymer has a B/S ratio from 70/30 to 60/40; at least one block of the vinyl aromatic monomer in the block copolymer is polydispersed having a polydispersity from 1.01 to 4; and B) from 97% to 50% in weight of a vinyl aromatic monomer.

10. The impact-resistant thermoplastic composition according to claim 9, wherein the molecular weight of the at least one block of the vinyl aromatic monomer of the impact modifier material is from 5,000 g/mol to 420,000 g/mol.

11. The impact-resistant thermoplastic composition according to claim 10, wherein the molecular weight of the at least one block of the vinyl aromatic monomer of the impact-resistant material is from 30,000 g/mol to 120,000 g/mol.

12. The impact-resistant thermoplastic composition according to claim 9, wherein the molecular weight of the block copolymer is from 100,000 g/mol to 450,000 g/mol.

13. The impact-resistant thermoplastic composition according to claim 9, wherein the vinyl aromatic monomer is an ethylenic unsaturated compound of formula (II)

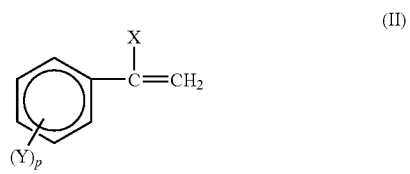

wherein X is a hydrogen or a $C_1$-$C_4$ alkyl radical;
p is zero or an integer from 1 to 5; and
Y is a halogen or a $C_1$-$C_4$ alkyl radical.

14. The impact-resistant composition according to claim 13, wherein the vinyl aromatic monomer is selected from the group consisting of vinyl toluene, styrene, methylstyrene, mono-, di-, tri-, tetra- and pentachlorostyrene and the corresponding alpha-methylstyrene, alkylated styrenes in the core and the corresponding alpha-methylstyrenes; ortho- and para-methylstyrenes, ortho- and para-ethylstyrenes, ortho-, para-methyl-alpha-styrenes, and mixtures or combinations thereof or with other copolymerizable monomers.

15. The impact-resistant thermoplastic composition according to claim 14, wherein the monomers copolymerizable with the vinyl aromatic monomer are selected from the group consisting of acrylic monomers, methacrylic, acrylonitrile and maleic anhydride.

16. The impact-resistant thermoplastic composition according to claim 9, wherein the alkadiene has 4 to 8 carbon atoms.

17. The impact-resistant thermoplastic composition according to claim 16, wherein the alkadiene is selected from the group consisting of 1,3-butadiene, isoprene, 2,3-dimethyl-1,3-butadiene, piperylene, and mixtures thereof.

18. The impact-resistant thermoplastic composition according to claim 17, wherein the alkadiene is 1, 3-butadiene.

* * * * *